J. WEEKS.
Weighing Scales.
No. 96,520.
Patented Nov. 2, 1869.
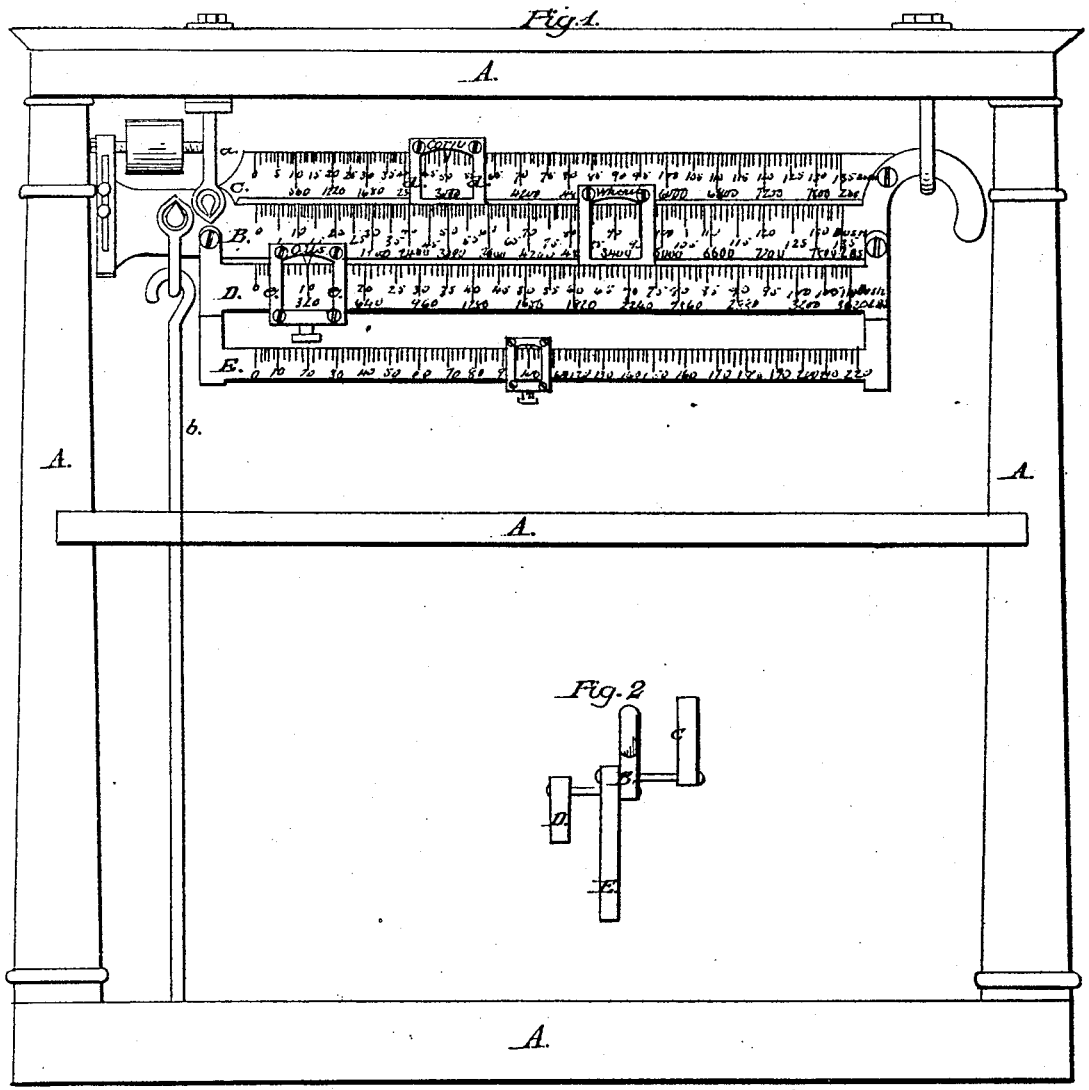

United States Patent Office.

JOHN WEEKS, OF BUFFALO, NEW YORK, ASSIGNOR TO HIMSELF AND BUFFALO AND NIAGARA SCALE-WORKS.

Letters Patent No. 96,520, dated November 2, 1869.

IMPROVEMENT IN WEIGHING-SCALES.

The Schedule referred to in these Letters Patent and making part of the same.

*To all whom it may concern:*

Be it known that I, JOHN WEEKS, of the city of Buffalo, in the county of Erie, and State of New York, have invented certain new and useful Improvements in Weighing-Scales; and I do hereby declare that the following is a full and exact description thereof, reference being had to the accompanying drawings, making part of this specification, in which—

Figure 1 is a side elevation, and

Figure 2, an end view of the beams, showing their relative positions.

Like letters of reference indicate corresponding parts in both figures.

My invention consists in providing and also in arranging on a weighing-scale four (4) or more beams, and also in their graduations to indicate not only pounds, tons, &c., but also bushels of grains or other commodities, each beam to answer a single or double purpose, as may be desired, and all supported by one fulcrum, and employing but one weighing-rod, and without the use of weights.

In the drawings—

A A represent the scale-frame.

B indicates the main beam, suspended on the ordinary fulcrum, *a*, with the weighing-rod *b*, as is usual in ordinary scales.

C represents another beam, arranged somewhat back and above, and attached to the main beam B. It is thus arranged and placed so that its graduations can be readily seen, and its poise (for indicating weight or bushels) as readily handled by the weigher.

D represents a third beam, attached just below and in front of beam B.

E represents the fourth and lowest beam, which is also attached to beam B, and occupies a position below, between that and the third beam D.

An important feature in my invention is thus placing, as above described, the beams above and below each other.

It is common to place two horizontal beams parallel to each other, but I believe myself to be the first to apply four or more beams to a scale, and to place them above and below each other, as hereinbefore described.

The object in using as many beams, is briefly this:

By the common method of weighing grain (wheat, corn, oats, &c.,) upon a scale where pounds are used, the same beam or weights can only be used to indicate in bushels but one kind of grain, and it becomes necessary to either take the weight in pounds and reduce them to bushels, or else to use as many different sets of weights as there are kinds of grains to be weighed, thereby rendering the weigher either liable to mistakes in changing pounds to bushels, or necessitating the changing of the weights every time he weighs a different kind of grain, which might result in the wrong weights being used, thereby involving trouble and loss. My method does away with this.

Herein lies another essential feature of my invention, which is the employment and use of as many different beams as there are grains to be weighed, (or other commodities,) which shall be attached to one fulcrum, and forming, in other words, a compound beam, by which the various kinds of grains, or other commodities of one or various denominations, can be weighed, and their weight shown in bushels, gallons, &c., by a glance of the weigher at the beam; or the same can be weighed without using weights, and doing away with the trouble and liability of mistakes in reducing pounds to bushels or some other denomination, by the use of my beams thus arranged and graduated.

To clearly explain the practical operation of and working of the different beams, by reference to the drawings, it will be seen that the "poise" *c*, on the main beam B, is marked for "wheat," and the upper graduations on the beam indicate bushels, and the lower, pounds.

For example, wheat, which weighs sixty pounds to the bushel, is being weighed, and the poise *c*, in its position, indicates ninety bushels, and a weight of five thousand four hundred pounds.

On beam C, the poise *d* is marked "corn," and its position indicates fifty bushels, weighing three thousand pounds, each bushel of corn weighing fifty-six pounds.

On the beam D, the poise *e* is marked for "oats," each bushel of which usually weighs thirty-two pounds, the weight varying in some States. In its position, the poise indicates ten bushels, or three hundred and twenty pounds.

On all these beams, each notch or mark indicates a bushel, the upper line or lines of figures showing the number of bushels, and the lower, the weight. When desired, graduating-marks will be also placed on the lower face of the beams, and an additional indicator or pointer will be arranged on the lower inner side of the poise, corresponding to the upper pointer or index.

The lower beam E is graduated only to pounds, which will at all times indicate the odd pounds for each and all the other beams, so that not only the number of the bushels, but the exact weight in pounds can be seen at once by the weigher and parties interested.

If desired, one or more of the main beams may be graduated to pounds, as well as bushels, or any other denomination, as before stated, or, if preferred, to pounds alone, so as to indicate the hundreds and thousands, or tons on the main beams, and the odd pounds to be taken from the lower beam, graduated to pounds, as in other weighing.

Any variation or combination that may be desired, can be made. The beams can either be used singly or together.

These improvements will prove of great value to those engaged in the grain-trade, especially large establishments, such as elevators, mills, &c.

It will prove of equal value in weighing coal at the mines, or for use in cheese-factories.

What I claim as my invention, and desire to secure by Letters Patent, is—

As an improvement in grain-scales, the diagonal arrangement or "spread" above and below the main beam B of the series of beams C D E, the beams B C D designating both weight and measure, but of different capacities, and the beam E being the unit-beam thereof, all beams having a common fulcrum, and by the diagonal arrangement exposing their faces simultaneously to view from a common stand-point, as and for the purpose set forth.

In witness whereof, I have hereunto signed my name, in the presence of two subscribing witnesses.

JOHN WEEKS.

Witnesses:
   J. R. DRAKE,
   ALBERT HAIGHT.